(12) United States Patent
Javanbakht (10) Patent No.: US 10,629,897 B2
(45) Date of Patent: Apr. 21, 2020

(54) HIGH PERFORMANCE CATHODE ACTIVE MATERIAL FOR LITHIUM ION BATTERY (71) Applicant: Mehran Javanbakht, Tehran (IR)

(72) Inventor: Mehran Javanbakht, Tehran (IR)

( * ) Notice: Subject to any disclaimer, the term of this patent is extended or adjusted under 35 U.S.C. 154(b) by 158 days.

(21) Appl. No.: 16/006,009

(22) Filed: Jun. 12, 2018

(65) Prior Publication Data
US 2019/0379037 A1 Dec. 12, 2019

(51) Int. Cl.
*H01M 4/36* (2006.01)
*H01M 10/0525* (2010.01)
*H01M 4/587* (2010.01)
*H01M 4/58* (2010.01)
*H01M 4/02* (2006.01)

(52) U.S. Cl.
CPC .......... *H01M 4/364* (2013.01); *H01M 4/587* (2013.01); *H01M 4/5825* (2013.01); *H01M 10/0525* (2013.01); H01M 2004/028 (2013.01); H01M 2220/20 (2013.01)

(58) Field of Classification Search
CPC .............. H01M 4/587; H01M 4/5825; H01M 2004/028; H01M 4/133
See application file for complete search history.

(56) References Cited

U.S. PATENT DOCUMENTS

2015/0102267 A1* 4/2015 Hu .................. H01M 4/04 252/506

* cited by examiner

*Primary Examiner* — Ladan Mohaddes (57) ABSTRACT

A cathode active material for use in high-performance lithium-ion battery, is disclosed. The cathode active material comprises a lithium iron phosphate/sulfonated graphene oxide (LFP/SG) nanocomposite material. The molar ratio of sulfonated graphene oxide (SG) to lithium iron phosphate (LFP) in the cathode active material is 0.1:1. The cathode active material is synthesized by microwave-assisted hydrothermal method. The high-performance lithium-ion battery comprises an anode plate, a cathode plate, a separator between the anode plate and the cathode plate, and a non-aqueous electrolyte solution. The cathode plate is composed of a layer of cathode active material, and the cathode active material is lithium iron phosphate/sulfonated graphene oxide (LFP/SG) nanocomposite material. The lithium iron phosphate/sulfonated graphene oxide (LFP/SG) nanocomposite material used for lithium-ion battery possess high rate capability, capacity and cycle stability.

14 Claims, 9 Drawing Sheets

HIGH PERFORMANCE CATHODE ACTIVE MATERIAL FOR LITHIUM ION BATTERY

BACKGROUND OF THE INVENTION

As conventional fossil energy sources are depleting and environmental protection issue is given increasing concern, the need for a new efficient green energy source is urgent. Lithium-ion battery, a strongly competitive new energy source, earns exceptional interest. In addition to its wide use in current portable mini-batteries, the development of lithium-ion batteries for use in high-power, high-energy power batteries is even more promising. The lithium-ion battery market is growing beyond expectations. The continuous progress is achieved by the development of new and/or enhanced electrode materials, which has led to considerable improvements in terms of both energy and power densities.

Furthermore, lithium-ion batteries are particularly used in electric vehicles (EV) and hybrid electric vehicles (HEV). Nevertheless, the application of these electrode materials is still limited in EV and HEV due to inherently poor rate capability arising from its low electronic conductivity. Since the diffusion of Li ions in and out of the electrode structure is frequently the rate determining step, this must be improved to allow a fast charge and discharge. With this aim in mind, researchers have put substantial efforts on developing new nanostructured materials, which facilitates the Li ion diffusion due to a reduced length within the active material particles and an increased electrode/electrolyte contact area.

A major class of these materials are phosphate-based cathode materials in the form of $LiMPO_4$ (M=Fe, Co, Ni, Mn) with olivine structure. $LiFePO_4$ (LFP) has become a very promising choice among phosphate-based cathode materials. It is well-suited for powering electric vehicles (EVs), hybrid electric vehicles (HEVs), electric bicycles and power tools, because of its low cost, non-toxicity, and environmental benignity. The reversible electrochemical lithium insertion/extraction reactions take place at around 3.5 V (vs. $Li/Li^+$) with a theoretical capacity of 170 $mAhg^{-1}$. In addition, LFP also has good cycle stability and excellent thermal stability.

Even with the rapidly changing technology space in this field, there presently remains a need for an efficient cathode active material for lithium ion batteries. Further, there is a need for a high performance active material for lithium ion battery to enhance the rate capability and the capacity of the lithium ion batteries.

SUMMARY OF THE INVENTION

One aspect of the present disclosure is directed to a high-performance lithium-ion battery, comprising: an anode plate, a cathode plate, a separator between the anode plate and the cathode plate, and a non-aqueous electrolyte solution, wherein the cathode plate is composed of a layer of cathode active material, wherein the cathode active material is lithium iron phosphate/sulfonated graphene oxide (LFP/SG) nanocomposite material.

In one embodiment, the molar ratio of sulfonated graphene oxide (SG) to lithium iron phosphate (LFP) in said cathode active material is 0.1:1. In another embodiment, said cathode active material is synthesized by microwave-assisted hydrothermal method. In one embodiment, the discharge capacity of said cathode active material is 168 $mAhg^{-1}$ at 0.2 C rate. In another embodiment, the discharge capacity of said cathode active material is 149 $mAhg^{-1}$ at 2 C rate. In a related embodiment, the discharge capacity of said cathode active material is 113 $mAhg^{-1}$ at 20 C rate. In another embodiment, the discharge capacity of said cathode active material is 93 $mAhg^{-1}$ at 30 C rate.

Another aspect of the present disclosure is directed to a cathode active material for a lithium-ion battery, comprising a lithium iron phosphate/sulfonated graphene oxide (LFP/SG) nanocomposite material. In a related embodiment, the molar ratio of sulfonated graphene oxide (SG) to lithium iron phosphate (LFP) in said cathode active material is 0.1:1. In one embodiment, the cathode active material is synthesized by microwave-assisted hydrothermal method. In another related embodiment, the discharge capacity of said cathode active material is 168 $mAhg^{-1}$ at 0.2 C rate. In one embodiment, the discharge capacity of said cathode active material is 149 $mAhg^{-1}$ at 2 C rate, is 113 $mAhg^{-1}$ at 20 C rate, and is 93 $mAhg^{-1}$ at 30 C rate.

In an aspect of the present invention, a cathode active material for use in high-performance lithium-ion battery is disclosed. The cathode active material comprises a lithium iron phosphate/sulfonated graphene oxide (LFP/SG) nanocomposite material. The molar ratio of sulfonated graphene oxide (SG) to lithium iron phosphate (LFP) in the cathode active material is about 0.1:1. The cathode active material is synthesized by microwave-assisted hydrothermal method. In another aspect of the invention, the high-performance lithium-ion battery constructed using said cathode active material is disclosed. The lithium-ion battery comprises an anode plate, a cathode plate, a separator between the anode plate and the cathode plate, and a non-aqueous electrolyte solution. The cathode plate is composed of a layer of cathode active material, and the cathode active material is lithium iron phosphate/sulfonated graphene oxide (LFP/SG) nanocomposite material. The lithium iron phosphate/sulfonated graphene oxide (LFP/SG) nanocomposite material used for lithium-ion battery possess high rate capability, capacity and cycle stability.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

The present invention generally relates to a cathode active material for lithium-ion battery. More specifically, the present invention relates to a lithium iron phosphate (LiFePO$_4$)/sulfonated graphene (LFP/SG) nano-composite based cathode active material for enhancing rate capability and capacity of the lithium-ion battery.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Lithium-ion batteries are used in electric vehicles (EV) and hybrid electric vehicles (HEV). Nevertheless, the application of these electrode materials is still limited in EV and HEV due to inherently poor rate capability arising from its low electronic conductivity. Since the diffusion of Li ions in and out of the electrode structure is frequently the rate determining step, this must be improved to allow a fast charge and discharge. With this aim in mind, researchers have put substantial efforts on developing new nanostructured materials, which facilitates the Li ion diffusion due to a reduced length within the active material particles and an increased electrode/electrolyte contact area.

A major class of these materials are phosphate-based cathode materials in the form of LiMPO$_4$ (M=Fe, Co, Ni, Mn) with olivine structure. LiFePO$_4$ (LFP) has become a very promising choice among phosphate-based cathode materials. It is well-suited for powering electric vehicles (EVs), hybrid electric vehicles (HEVs), electric bicycles and power tools, because of its low cost, non-toxicity, and environmental benignity. The reversible electrochemical lithium insertion/extraction reactions take place at around 3.5 V (vs. Li/Li$^+$) with a theoretical capacity of 170 mAhg$^{-1}$. In addition, LFP also has good cycle stability and excellent thermal stability.

Due to these advantages, LFP is attracting greater attention as a promising new cathode electrode material for lithium-ion batteries. The low intrinsic electronic conductivity of LFP and the low diffusion co-efficient of Li$^+$ are the main shortcomings that limited its application in industry. Bare LFP is an insulator with an electrical conductivity of about $10^{-9}$ to $1^{-10}$ S cm$^{-1}$ and the chemical diffusion co-efficient are found to be in the range of $10^{-12}$ to $10^{-14}$ cm$^2$ s$^{-1}$ depending on the Li$^+$ concentration and the characterization method used. The poor electrical and ionic conductivity of LFP characterizes its lower rate capacity and low utilization.

Three approaches can improve the electrochemical performance of LFP: (1) one can enhance the electronic conductivity by introducing conductive additives, i.e., coating carbon through the synthesis of LFP/C composite or dispersing copper, silver, etc., into the solution during synthesis. Electrochemical performances are improved by adding metal oxide additives like nano Al$_2$O$_3$, nano MgO and neutral alumina into LFP electrodes. (2) one can control the particle size and grow homogenous polycrystalline LFP nano particles by optimizing the synthesis conditions, and (3) one can selectively dope with cations supervalent to Li.

Graphene-based composites have evolved and it is contemplated that these would be suitable candidates to resolve the above-mentioned problems of LFP because graphene oxide (G) and reduced graphene oxide (rGO) are two-dimensional carbon materials with high surface area, structural flexibility, and desired electrical conductivity.

The synthesis of LFP/G composites capable of exhibiting excellent electrochemical properties without the use of additional conductive agents in electrodes is highly desirable. An effective approach to improve the properties of LFP/G composites would be to retain the properties and homogeneity of graphene in the composites. To fully exploit the properties of graphene in such composites, applicants here recognized that it may be necessary to prevent the restacking of graphene sheets because restacked graphene has low electronic conductivity and surface area as compared those of graphene.

Complex transition metal oxides and phosphates are currently the main cathode active materials used in Li-ion battery cells. These include: Lithium Cobalt Oxide (LCO), Lithium Nickel Manganese Cobalt Oxide (NMC), Lithium Nickel Cobalt Aluminum Oxide (NCA), Lithium Manganese Oxide (LMO) and Lithium Iron Phosphate (LFP). With the exception of LCO, all these materials are currently used in automotive Li-ion battery cells. As a result of aforementioned reasons and broad usage of cathode materials all over the globe, preparing of this cathode material in a way in which low rate capability of cathode material would be desirable. This present disclosure addresses this issue and a nano composite material can be considered as the next generation of cathode materials for application in Li-ion batteries industry.

The present invention discloses a cathode active material for lithium-ion battery. Said cathode active material is a nano-composite based cathode active material for enhancing rate capability and capacity of the lithium-ion battery. In an embodiment of the present invention, the cathode active material comprises a lithium iron phosphate/sulfonated graphene oxide (LFP/SG) nanocomposite material. The cathode active material is synthesized by microwave-assisted hydrothermal method.

In one embodiment, the molar ratio of sulfonated graphene oxide (SG) to lithium iron phosphate (LFP) in the cathode active material is 0.1:1. In some embodiments, the discharge capacity of said cathode active material are 168 mAh g$^{-1}$, 149 mAh g$^{-1}$, 113 mAh g$^{-1}$ and 93 mAh g$^{-1}$ at 0.2 C, 2 C, 20 C and 30 C rate, respectively. Further, said cathode active material characterized with good capacity retention rate at high rates up to 50 C. These results are due to the effect of SG in the composite providing plenty interconnected open pores, which prepares a continuous mixed conducting network with mainly functional groups and facilitates the electron transportation and Li-ions diffusion throughout the cathode nanocomposite.

In another embodiment of the invention, the high-performance lithium-ion battery constructed using said cathode active material is disclosed. In an embodiment, the lithium-ion battery comprises an anode plate, a cathode plate, a separator between the anode plate and the cathode plate, and a non-aqueous electrolyte solution. The cathode plate is composed of a layer of cathode active material, and the cathode active material is lithium iron phosphate/sulfonated graphene oxide (LFP/SG) nanocomposite material. The lithium iron phosphate/sulfonated graphene oxide (LFP/SG) nanocomposite material used for lithium-ion battery possess high rate capability, capacity and cycle stability.

According to the present invention, lithium ion battery effectively employs sulfonation of graphene oxide (SG) to increase the dispersibility of graphene nanosheets, enhance the Li-ion diffusion rate in the LFP bulk and facilitate the self-assembly of in-situ grown nano-crystalline LFP. The novel LFP/SG comprises improved morphology and more qualified graphene nanosheets. The sulfonated groups anchored on the graphene nanosheets effectively restrict the growth of LFP particles and aggregation of graphene nanosheets that reduce the Li-ion's diffusion path and enhance the ion conductivity in LFP/SG material. The LFP/SG synthesized exhibit a high specific capacity, excellent rate capability, and good cycling stability. It is indisputable that enhancing the rate of Li ions transfer and decreasing the charge transfer resistance would solve the rate capability of the obtained cathode active material.

The physico-chemical properties of the synthesized cathode active materials are discussed and compared in terms of surface morphology, nanostructure and electrochemical properties, in the following examples. The influences of utilizing SG on the structural and electrochemical properties of cathode active material were comparatively investigated between the LFP/SG and LFP/G (pristine) materials. In addition, both prepared precursors are followed by carbonization via glucose or tartaric acid under the same calcinations procedure. LFP/SG showed significantly superior high rate capability, capacity and cycle stability than the pristine LFP/G.

LFP/SG nanocomposites exhibits much smaller peak separation and sharper redox peaks than the pristine material even at high scan rate of 0.5 mV s$^{-1}$. This indicates a desirable kinetics of oxidation/reduction process, low polarization and superior reversible behavior of the modified composite, mainly due to the sulfonation of graphene nanosheets. In addition, the peak profile of LFP/SG cathode is more symmetric and has higher current density compared with the pristine LFP/G. These results imply better reversibility of lithium extraction/insertion, higher electrochemical activity and conductivity, and stronger lithium intercalation/deintercalation reactions in the new composite material.

The global lithium-ion battery market is expected to reach USD 93.1 billion by 2025, growing at a CAGR of 17.0% according to a new report by Grand View Research, Inc. Increased usage of lithium-ion batteries in electric vehicles, portable consumer electronics and grid storage systems owing to its high energy density and high safety level is expected to drive market demand. Lithium-ion batteries are used in applications that require lightweight and high-energy density solutions. These batteries provide the highest energy density per weight and are mostly used in cellular phones, notebook computers, and hybrid automobiles.

Technological advancements to reduce the weight of batteries, cost and increase their power output, is expected to augment industry expansion. In addition, competent distribution channels are likely to be an important way to gain a competitive advantage. Energy storage system is expected to witness the fastest growth over the forecast period at a CAGR of 21% from 2017 to 2025 owing to the developments in wind and solar PV in countries including Germany, China and US.

The global lithium-ion battery market encompasses the various material types and industry verticals present in this segment. The material type segment namely cathode, anode, electrolytic solution and others such as, foils, binders, and separators, are covered within the scope of the invention. The industry verticals include sectors such as electronic, automotive, and industrial, with applications in the medical, military, and textile industries. The market by industry verticals is further segmented into electronics, automotive, industrial, and others such as medical, military and textile. Currently, electronics is the highest revenue-generating industry verticals for this market owing to increase in adoption of lithium-ion batteries in smartphones, tablets, laptops, and personal computers. However, automotive segment is expected to be the most lucrative industry owing to rise in demand for electric vehicles and hybrid vehicles.

The following examples are intended to illustrate certain embodiments of the present invention, but do not exemplify the full scope of the invention.

EXAMPLES

Example-1: Synthesis of LFP/SG

LFP/SG composite was prepared via a microwave-assisted hydrothermal process. Firstly, a suspension of SG (10 wt. % of the obtained LFP) was mixed with 0.3 M LiOH solution. Thereafter, mixed solution of 0.1 M $H_3PO_4$, glucose and 0.1 M $FeSO_4.7H_2O$ was added to the prepared suspension at vigorous agitation. Glucose was weighed in stoichiometric amounts according to the LFP: C weight ratios of 100:5. Afterwards, the resulting mixture was transferred into a 100 mL Teflon-lined stainless steel autoclave and followed by a hydrothermal treatment at 170° C. for 8 h. In order to prevent the oxidation of $Fe^{2+}$, the whole mixing processes was carried out under nitrogen atmosphere. The product was centrifuged, washed with de-ionized water and vacuum-dried at 60° C. overnight. This method was further microwave-assisted so that the material was more efficient in performance. The obtained material was transferred to a domestic microwave at 160° C. for 5 min in the presence of the activated carbon. This method is in order to complete carbonization and increase the crystallinity and conductivity of the LFP/SG sample. The obtained nanocomposite was used as the main component of the cathodic material.

Example-2: Physical Characterization—FT-IR Test

In order to space-confinement, to prevent the restacking of graphene sheets because restacked graphene sheets and good electronic/ionic conductivity and homogeneity, SG was used for controlling the morphology of LFP/SG in the nanocomposites to determine an optimal point for the highest surface area and good electrochemical properties such as high specific capacity, excellent rate performance, and superior cycling stability of LFP/SG.

Figure 1:
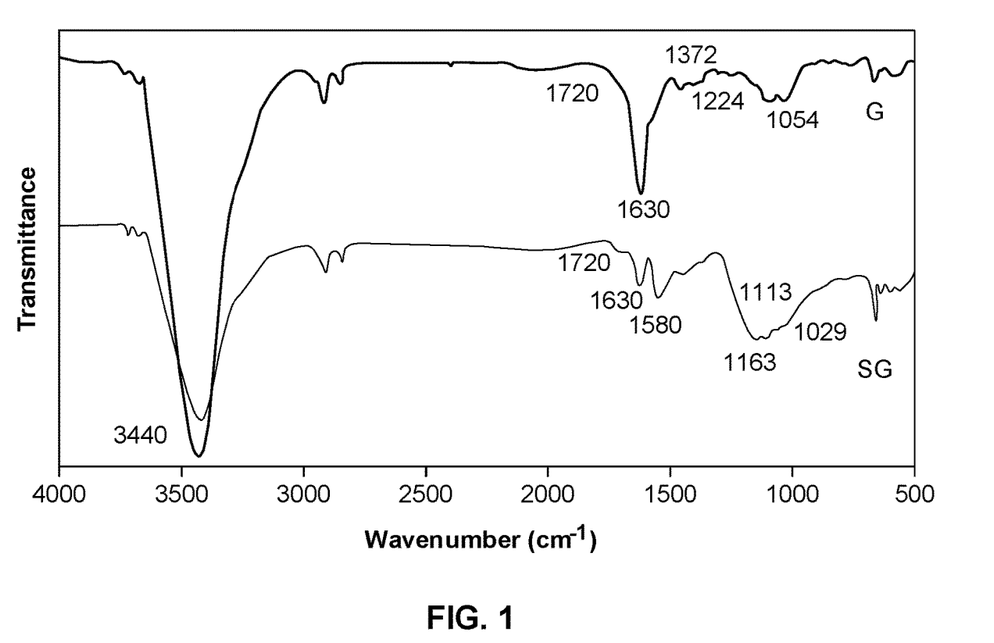
FIG. 1 exemplarily illustrates FT-IR spectra of obtained graphene and sulfonated graphene, according to an embodiment of the present invention.

FIG. 1 illustrates FT-IR spectra of obtained graphene and sulfonated graphene, according to an embodiment of the present invention. In the FT-IR spectrum of G, it is clearly observed a strong and broad absorption at 3425 cm$^{-1}$ related to O—H stretching vibration. The peaks at 1372 cm$^{-1}$ and 1224 cm$^{-1}$ correspond to the skeletal vibrations of C—OH and C—O—C in unoxidized graphitic domains. The bands at 1724 cm$^{-1}$ and 1051 cm$^{-1}$ are attributed to C=O and C—O stretching vibration bands of COOH groups. The peak at 1623 cm$^{-1}$ may be related to the skeletal vibrations of unoxidized graphitic domains and the adsorbed water molecules. Sulfonated graphene (SG) spectrum shows three peaks at 1163 cm$^{-1}$, 1113 cm$^{-1}$, and 1029 cm$^{-1}$ which confirms the presence of a sulfonic acid groups on the graphene sheets surface. The peak at 830 cm$^{-1}$ indicates characteristic vibrations of a p-disubstituted phenyl group. After reduction the absorption peak of C=O in COOH functional groups at about 1720 cm$^{-1}$ clearly diminishes, demonstrating the successful reduction of grapheneoxide to reduced forms.

Example-3: Physical Characterization—Elemental Analysis

The elemental analysis of graphene (G) and sulfonated graphene (SG) nanosheets was performed by CHNS test and the elemental content of each sample in percentage are shown in Table 1. The content of sulfur in SG was evaluated about 3.83 wt %. The results indicate that the graphene oxide nanoparticles are successfully functionalized with aryl sulfonic acid groups without damaging to the graphene oxide structure. The CHNS analysis indicates that the aryl sulfonic group is introduced on the surface of graphene oxide and proportion of oxygen functional groups in SG decrease compared to G nanosheets after sulfonation.

TABLE 1

Result of CHNS test for obtained SG and G samples

| Nano materials | Carbon % | Oxygen % | Sulfur % |
|---|---|---|---|
| G | 56.36 | 43.18 | 0 |
| SG | 64.77 | 30.12 | 3.83 |

Example-4: Physical Characterization—XRD Analysis

Figure 2A:
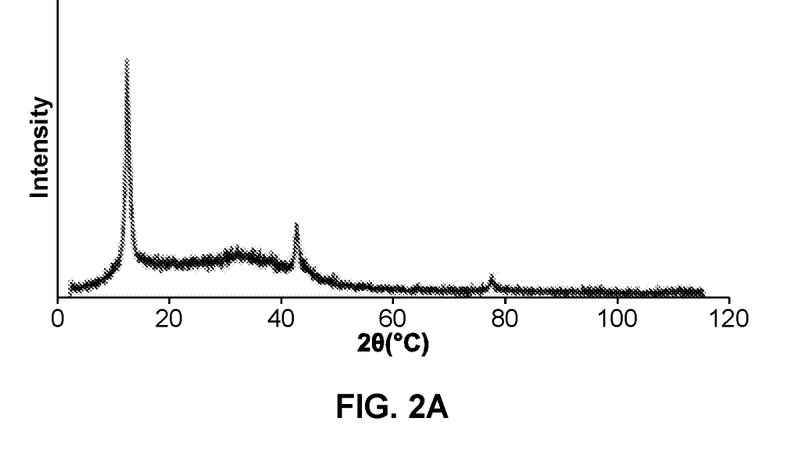
FIG. 2A exemplarily illustrates XRD pattern of graphene, according to an embodiment of the present invention.
Figure 2B:
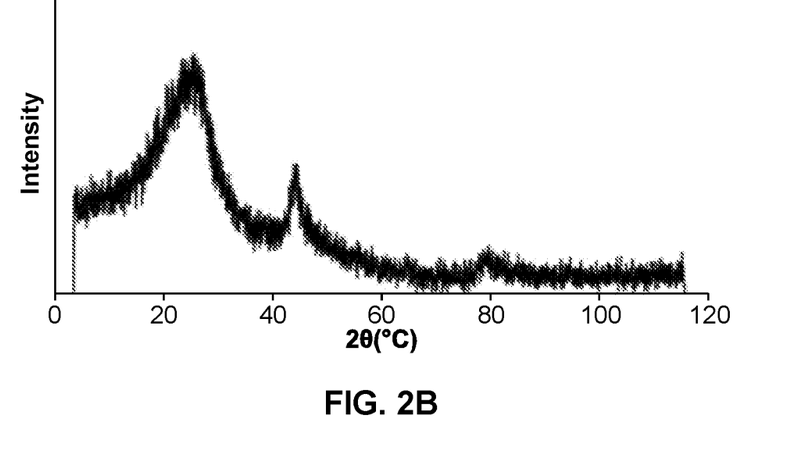
FIG. 2B exemplarily illustrates XRD pattern of sulfonated graphene, according to an embodiment of the present invention.
Figure 2C:
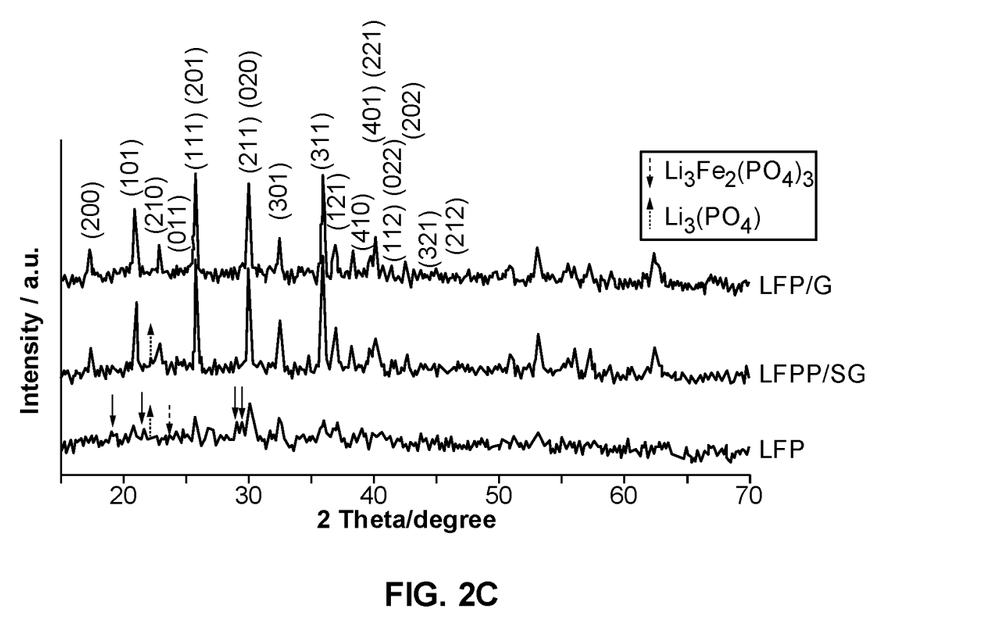
FIG. 2C exemplarily illustrates XRD pattern of LFP/G, LFP/SG and pure LFP, according to an embodiment of the present invention.

The XRD analyses of prepared graphene (G), sulfonated graphene (SG), and LFP, LFP/SG and LFP/G nano materials are shown in FIG. 2A-FIG. 2C. Natural graphite shows a sharp diffraction peak at 2θ=26.6° corresponding to the (002) plane, indicating a highly organized crystal structure with a layer-to-layer distance of 0.33 nm. As for G, the peak (001) is observed at 2θ=11.9°, which indicates that the interlayer spacing is about 0.75 nm calculated using Bragg's law (λ=2d sin θ). This value is much larger than that of graphite due to the generation of oxygen containing functional groups between layers. The corresponding XRD patterns given in FIG. 2A shows a peak shift from 2θ=11.9° for G to 2θ=26.3° (d=0.41 nm) (002) for SG implying that the largely exfoliated graphene oxide sheets partially restacked through π-π interaction upon sulfonation. XRD pattern of the LFP composites were investigated to survey their crystalline structure. The XRD patterns of the new LFP/SG composite and pristine LFP/G are shown in FIG. 2B.

FIG. 2C illustrates XRD pattern of LFP/G, LFP/SG and pure LFP, according to an embodiment of the present invention. The main phase of all prepared materials can be assigned to an ordered olivine structure indexed by orthorhombic P$_{nma}$ olivine structure (JCPDS No. 40-1499). The X-ray pattern of both G and SG treated samples LFP/G and LFP/SG are almost the same and exhibit more intense peaks and a high crystalline quality. This high crystallinity may enhance the electrochemical performance by postponing the chemical dissolution of iron from the cathode active material in the electrolyte.

However, compared to the LFP/G, the intensity of diffraction peaks of LFP/SG sample increases apparently, representing a higher crystallinity of the latter composite. This indicates that the sulfonation of graphene sheets has an obvious constructive effect on the crystallinity of the LFP/G products. Because of nanometer size or non-crystalline nature of the impurities, they are often invisible for XRD analysis. It could be assumed that through using SG nanosheets, the LFP/SG nano tends to become purer LFP (as evidenced by the next Raman section) and the electrode performance will be better compared to the unmodified sample. This indicates that sulfonic groups introduced on GNSs not only can direct the formation of lamellar nanostructure as a soft template, but also can prohibit the impurities.

The higher full widths at half maximum (FWHM) of the XRD peaks in the LFP/SG composite, verified by the Scherer equation implies smaller crystallite size of it than those of the LFP/G. This could be ascribed to the presence of sulfonic groups which can act as favorable nucleation sites compared with competing crystallite growth process leading to smaller particle size as evidenced by SEM.

All of these reveal that the sulfonation of graphene is beneficial for producing a new LFP/SG composite with high-purity and crystallinity standards.

Example-5: Thermal Stability and Thermal Gravimetry Tests

Figure 3:
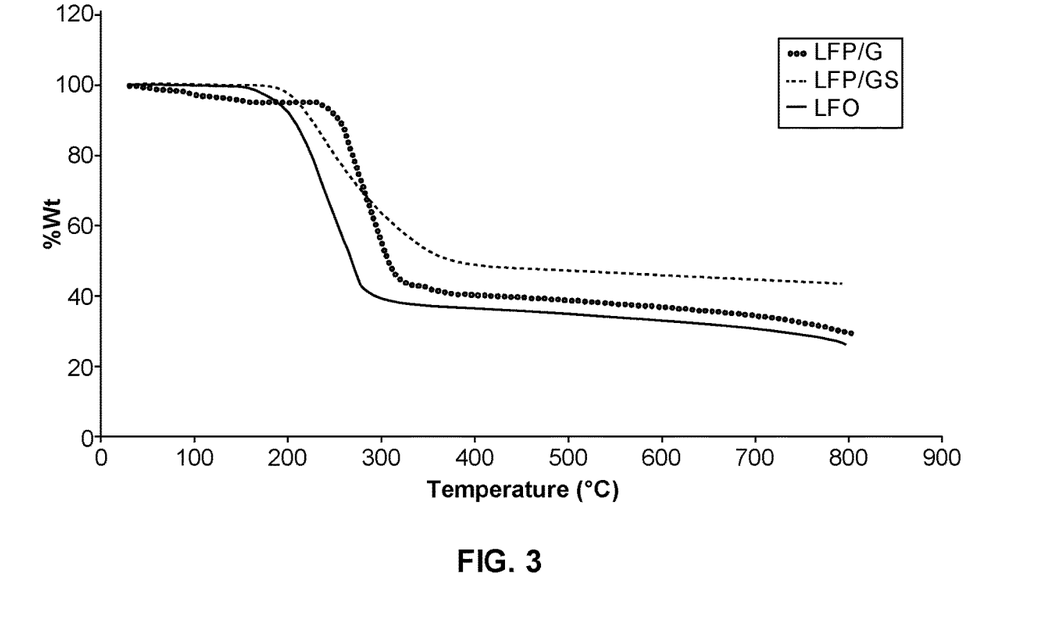
FIG. 3 exemplarily illustrates thermal gravimetry behavior of as prepared samples LFP, LFP/G and LFP/SG, according to an embodiment of the present invention.

The reaction process from products can be monitored through the TG/DTA analysis under flowing argon reported in FIG. 3. Up to 200° C., one may observe a first broad endothermic peak corresponding to the weak weight loss region due to evaporation of some moisture and dehydration of organic compounds. The higher rate of initial weight loss of LFP indicates that its thermal stability is lower compared to that of LFP/G and LFP/SG. The greater thermal resistance of the latter results from the cross-linking between carboxyl and extra hydroxyl reactions can lead to the formation of a more rigid structure.

Example-6: BET and BJH

Figure 4A:
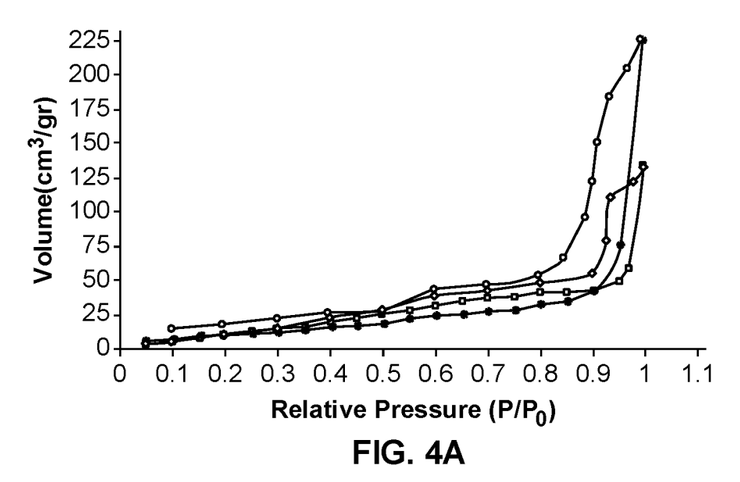
FIG. 4A exemplarily illustrates $N_2$-Adsorption/desorption isotherms of LFP/G and LFP/SG, according to an embodiment of the present invention.
Figure 4B:
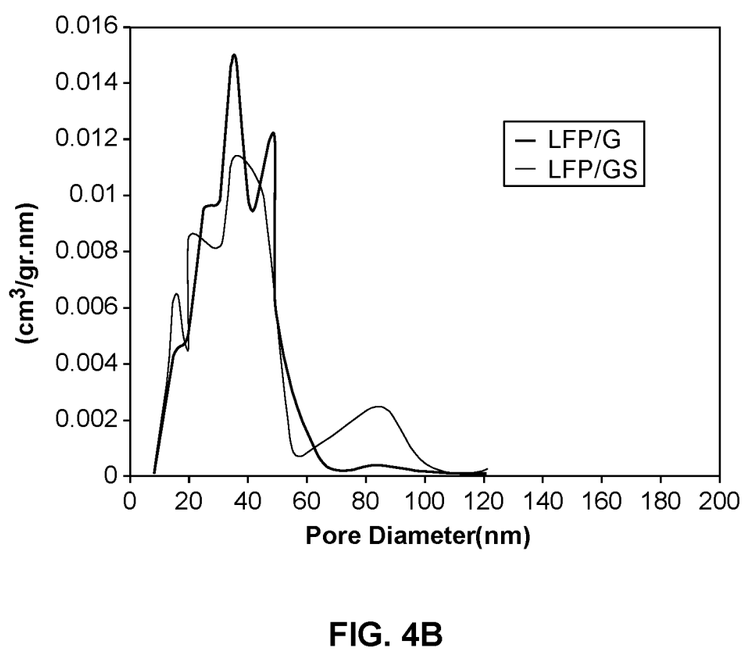
FIG. 4B exemplarily illustrates $N_2$-Adsorption/desorption isotherms of pore size distribution obtained from BJH test of obtained samples, according to an embodiment of the present invention.

FIG. 4A illustrates N$_2$-Adsorption/desorption isotherms of LFP/G and LFP/SG. FIG. 4B illustrates N$_2$-Adsorption/desorption isotherms of pore size distribution obtained from BJH test of obtained samples. All isotherms feature hysteresis at relative pressure $p/p_0$ ranging from 0.6 to 1.0 between desorption and adsorption branches. This can be classified as the type IV curve with an $H_3$ hysteresis loop as defined by IUPAC, which is characteristic of mesoporous solids. Compared to LFP/G, LFP/SG adsorbed much more nitrogen indicating a high pore volume and high specific surface area, (i.e. 42.5 m$^2$/g, 25.9 m$^2$/g and 22.8 for LFP/SG, LFP/G, and LFP respectively). It may be argued that higher porosity is a consequence of the stability of chemical attachment of the organic precursors and carbon layer on the surface of the LFP particles. This improved interconnection of carbon nano-particles and graphene nanosheets among the LFP grains, which favors electrolyte penetration in the cathode, and, thus, enhances lithium ions access to active material.

The results of BJH pore size distribution (inset of FIG. 4B) confirm that bothnano composites are principally mesoporous. Compared to LFP/SG, LFP/G shows broader pore size distribution and demonstrate the presence of a larger fraction of macropores (larger than 50 nm). This may confirm heterogeneous structure formation on some parts of the surface of the LFP/G. This shows that the specific surface area and porosity can be mostly attributed to the porous graphene phase in the composites. It is thus reasonable to assume that the BJH pore sizes distribution represents the pore size distribution in the coating carbon layer.

Example-7: Electrochemical Characterization

To demonstrate this successful design of the LFP/SG cathode material, the electrochemical performance including cyclic voltammetry (CV), charge/discharge and electrochemical impedance measurements were evaluated.

Example-8: Electrochemical Impedance Spectra (EIS)

Figure 5:
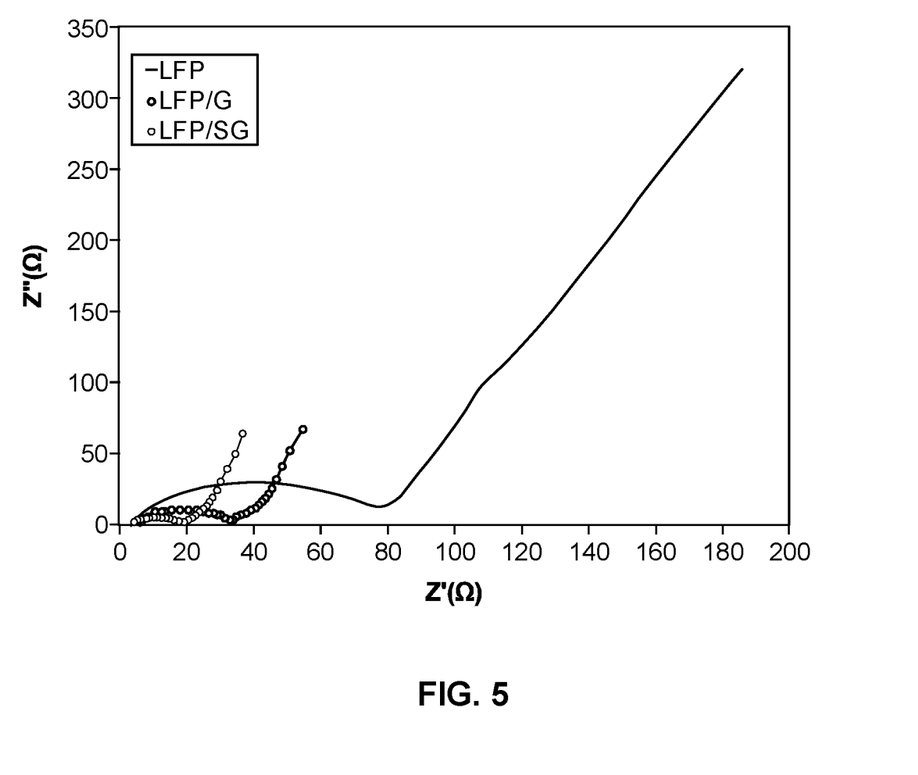
FIG. 5 exemplarily illustrates electrochemical impedance spectroscopy of LFP, LFP/G and LFP/SG cathode active materials, according to an embodiment of the present invention.

Accordingly, electrochemical impedance spectra (EIS) were also carried out to investigate further the influence of graphene sulfonation on the electrochemical behavior of the new cathode material. The Nyquist plots of the pristine LFP and modified LFP/G and LFP/SG electrodes are shown in FIG. 5. As could be seen, the EIS spectra of all samples are composed of a depressed semicircle in the high to middle frequency region and a straight slopping line at the low frequency region. The numerical value of the diameter of the semicircle on the $Z_{real}$ axis is approximately equal to the charge transfer resistance ($R_{ct}$) at the electrode-electrolyte interface; while the slope line at low frequency region is attributed to the lithium ion diffusion process within the bulk of the electrode material or so-called Warburg impedance ($Z_w$). The mass resistance of samples inversely is proportional to the slope of the inclined line in the low frequency region. From comparing the diameters of the semicircles in the Nyquist plots which is monitored in FIG. 5, the impedance of the LFP/SG electrode is significantly smaller than that of the pristine LFP and LFP/G. This implies a remarkable decrease in charge transfer resistance ($R_{ct}$) and mass transfer resistance.

Example-9: Cyclic Voltammetry

Figure 6A:
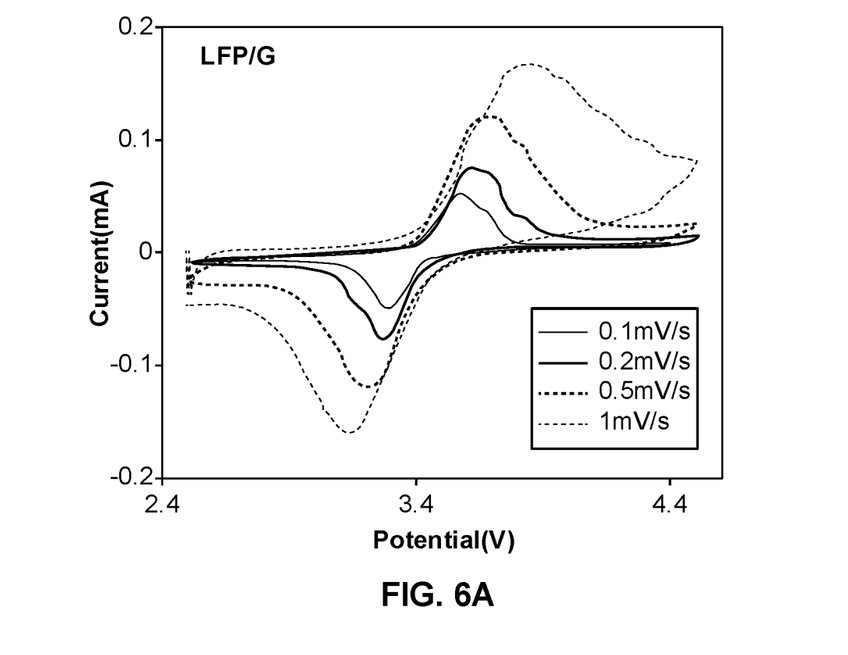
FIG. 6A exemplarily illustrates CV curves of LFP/G cathode material at different scan rates, according to an embodiment of the present invention.
Figure 6B:
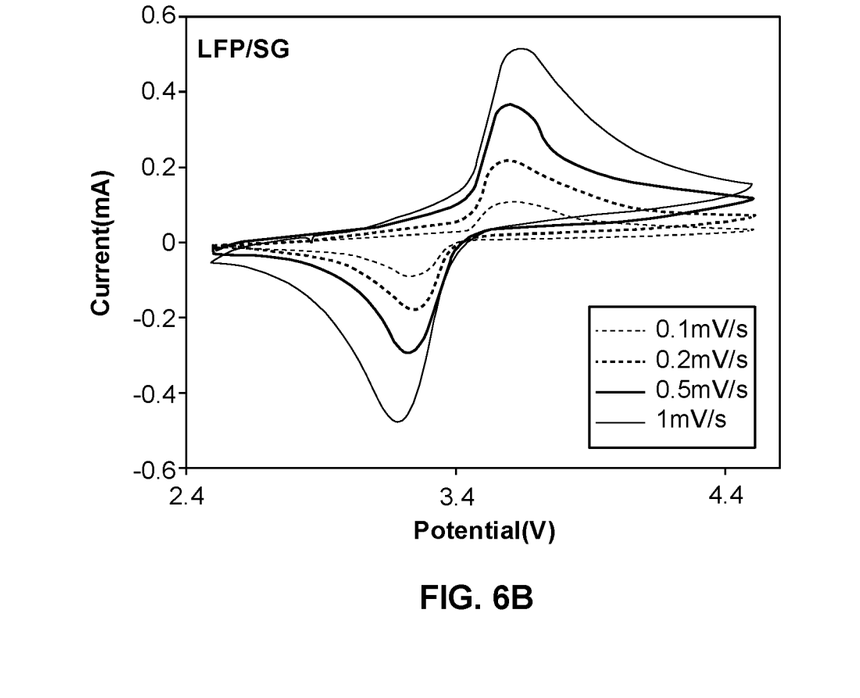
FIG. 6B exemplarily illustrates CV curves of LFP/SG cathode material at different scan rates, according to an embodiment of the present invention.

It should be noted that CVs are applied to investigate the effect of using sulfonated graphene nanosheets on the intercalation/deintercalation kinetics of lithium ions and electrochemical rate capability of the LFP/SG and LFP/G nanocomposites. FIG. 6A and FIG. 6B show the CV curves for the LFP/G and LFP/SG samples at a scan rate of 0.5 mV s$^{-1}$.

Both electrodes exhibit a couple of pronounced redox peaks, attributed to the oxidation and reduction of $Fe^{2+}/Fe^{3+}$ accompanied along with the Li$^+$ insertion/extraction in LFP cathodes. As can be seen, the modified LFP/SG composite exhibits much smaller peak separation and sharper redox peaks than the pristine material even at high scan rate of 0.5 mV s$^{-1}$. This indicates a desirable kinetics of oxidation/reduction process, low polarization and superior reversible behavior of the modified composite, mainly due to the sulfonation of graphene nanosheets.

In addition, the peak profile of LFP/SG cathode is more symmetric and has higher current density compared with the pristine LFP/G. These results imply better reversibility of lithium extraction/insertion, higher electrochemical activity and conductivity, and stronger lithium intercalation/deintercalation reactions in the new composite material. Indeed, this fact is mainly owing to the sulfonation of graphene nanosheets, which could promote diffusion of lithium ions through the electrochemical reaction by increasing electronic conductivity and reducing the distance of lithium ion diffusion in the composite electrode.

On the other hand, sulfonate groups anchored on the graphene nanosheets could keep them from restacking in the composite and produce available voids for excellent electrolyte access. At the same time, the existence of electrostatic interactions between Li ions and the sulfonated groups could facilitate fast ion diffusion significantly. Consequently, one can expect superior rate capability and higher electrochemical performance of the new LFP/SG cathode nanocomposite.

Example-10: Galvanostatic Charge and Discharge

Figure 7A:
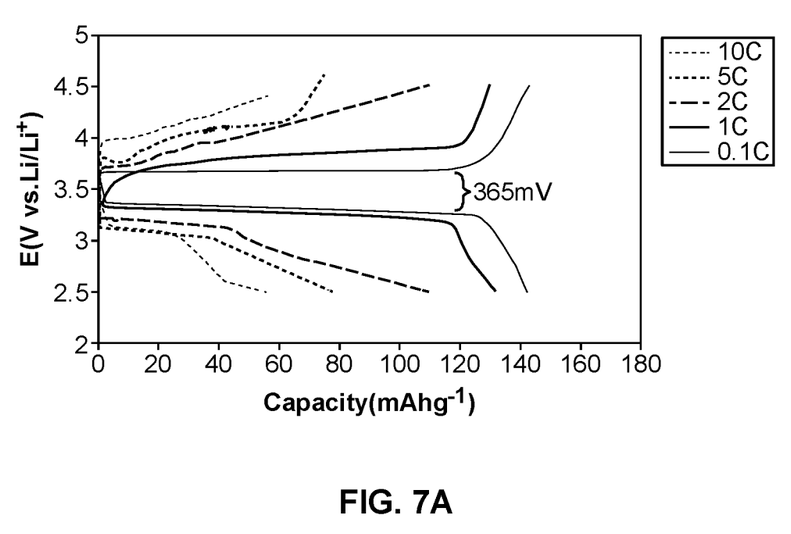
FIG. 7A exemplarily illustrates Galvanostatic charge and discharge of LFP/G, according to an embodiment of the present invention.
Figure 7B:
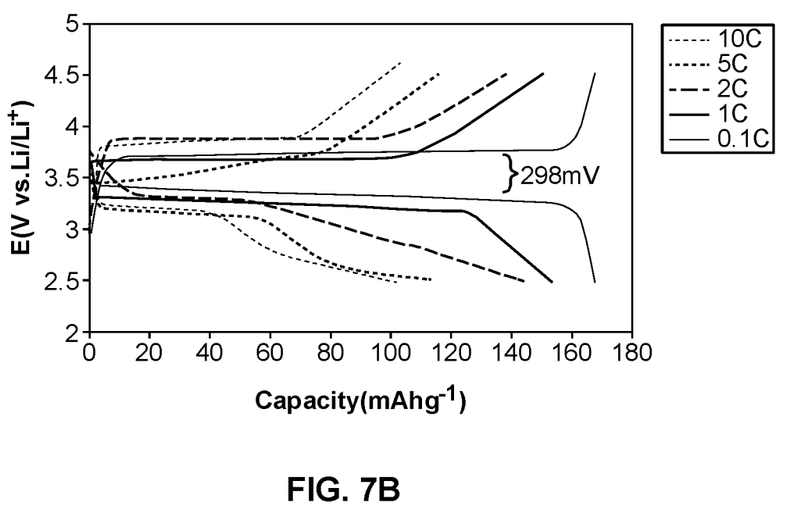
FIG. 7B exemplarily illustrates Galvanostatic charge and discharge of LFP/SG, according to an embodiment of the present invention.
Figure 7C:
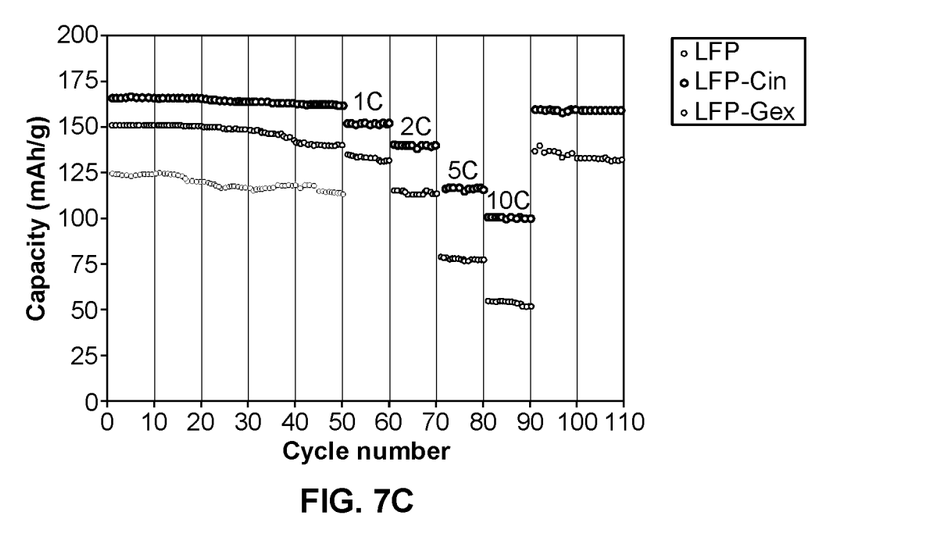
FIG. 7C exemplarily illustrates cycle stability of the obtained nanocomposites, according to an embodiment of the present invention, and FIG. 7D exemplarily illustrates rate performance of the obtained nanocomposites, according to an embodiment of the present invention.

The electrochemical performance of the obtained nanocomposites was evaluated by Galvanostatic charge/discharge cycling within a potential window of 2.5-4.5 V vs. Li/Li$^+$. FIG. 7A show typical charge/discharge profiles of the LFP/G samples at a rate of 0.2 C and 2 C. FIG. 7B exemplarily illustrates Galvanostatic charge and discharge of LFP/SG. As could be seen, both electrodes display plateaus around 3.4-3.6 V (vs. Li/Li$^+$) corresponding to the reversible phase transition between LiFePO$_4$ and FePO$_4$. The LFP/SG electrode delivered a specific capacity of 168 and 149 mAh g$^{-1}$ at 0.2 C and 2 C rates, respectively. These values are higher than that of the LFP/G (151 for 0.2 C and 122 mAh g$^{-1}$ for 2 C) indicating that after the sulfonation of graphene sheets, the specific capacity of LFP/G composite is notably improved. FIG. 7C exemplarily illustrates cycle stability of the obtained nanocomposites.

Figure 7D:
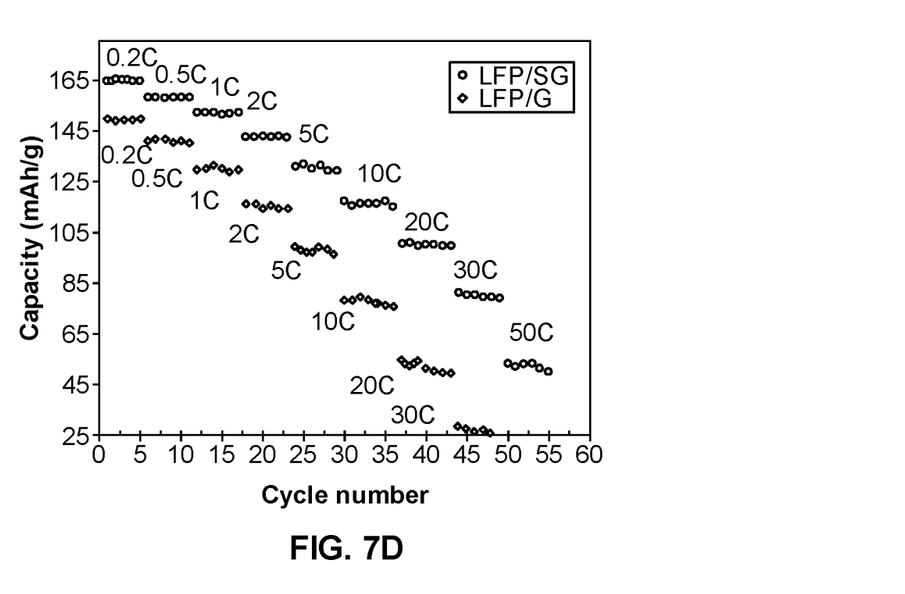

Furthermore, the LFP/SG nanocomposite exhibits a much longer flat voltage plateau and a smaller polarization potential relative to the pristine LFP/G one. These results indicate that the lithiation/delithiation reaction kinetics resistances are relieved in the new nanocomposite. The improvement achieved here is explained by the presence of sulfonated graphene nanosheets, which disperse well and inhibit further the LFP particles growth, more constructed channels and excellent electronic and, particularly ionic conductive network together with the graphene among the LFP particles leading to improved Li$^+$ accessibility and diffusion to greater proportions of active material. Based on these results it is worth noting that characteristic flat discharge plateau of LFP/SG is upper than that of LFP/G at higher cycling rate of 2 C. Therefore, the new LFP/SG cathode can keep up not only a high discharge capacity but also a high discharge voltage at high rate operations. The remarkable success of the LFP/SG cathode is confirmed by comparison of the rate and cycling performance which is monitored in FIG. 7D. LFP/SG can be regarded as the best obtained samples in this project in comparison with all other samples.

One aspect of the present disclosure is directed to a high-performance lithium-ion battery. This battery comprises an anode plate, a cathode plate, a separator between the anode plate and the cathode plate, and a non-aqueous electrolyte solution, wherein the cathode plate is composed of a layer of cathode active material that includes a lithium iron phosphate/sulfonated graphene oxide (LFP/SG) nanocomposite material. The molar ratio of sulfonated graphene oxide (SG) to lithium iron phosphate (LFP) in said cathode active material may be about 0.1:1.

The discharge capacity of the cathode active material is different at different rates. For example the discharge capacity of the cathode active material may be about 168 mAhg$^{-1}$ at 0.2 C rate, 149 mAhg$^{-1}$ at 2 C rate, 113 mAhg$^{-1}$ at 20 C rate, and 93 mAhg$^{-1}$ at 30 C rate. Another aspect of the present disclosure is directed to a cathode active material for a lithium-ion battery that comprises a lithium iron phosphate/sulfonated graphene oxide (LFP/SG) nanocomposite material. The molar ratio of sulfonated graphene oxide (SG) to lithium iron phosphate (LFP) in said cathode active material is about 0.1:1. The cathode active material may be synthesized by a microwave-assisted hydrothermal method.

The cathode active material for use in high performance lithium ion battery that is disclosed in one aspect of the present disclosure comprises a lithium iron phosphate/sulfonated graphene oxide (LFP/SG) nanocomposite material. The molar ratio of sulfonated graphene oxide (SG) to lithium iron phosphate (LFP) in the cathode active material may be about 0.1:1. Furthermore, the discharge capacity of the cathode active material may be about 168 mAhg$^{-1}$, 149 mAhg$^{-1}$, 113 mAhg$^{-1}$ and 93 mAhg$^{-1}$ at 0.2 C, 2 C, 20 C and 30 C rate, respectively. Further, the cathode active material is characterized with good capacity retention rate at high rates up to 50 C.

The high-performance lithium-ion battery constructed using said cathode active material is another feature of the present disclosure. The lithium-ion battery may comprise an anode plate, a cathode plate, a separator between the anode plate and the cathode plate, and a non-aqueous electrolyte solution. The cathode plate may be composed of a layer of cathode active material, and the cathode active material is lithium iron phosphate/sulfonated graphene oxide (LFP/SG) nanocomposite material. The lithium iron phosphate/sulfonated graphene oxide (LFP/SG) nanocomposite material used for lithium-ion battery possess high rate capability, capacity and cycle stability.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A high-performance lithium-ion battery, comprising:
    an anode plate, a cathode plate, a separator between the anode plate and the cathode plate, and a non-aqueous electrolyte solution, wherein the cathode plate is composed of a layer of cathode active material, wherein the cathode active material is lithium iron phosphate/sulfonated graphene oxide (LFP/SG) nanocomposite material.

2. The battery of claim 1, wherein the molar ratio of sulfonated graphene oxide (SG) to lithium iron phosphate (LFP) in said cathode active material is 0.1:1.

3. The battery of claim 1, wherein said cathode active material is synthesized by microwave-assisted hydrothermal method.

4. The battery of claim 1, wherein the discharge capacity of said cathode active material is 168 mAh g$^{-1}$ at 0.2 C rate.

5. The battery of claim 1, wherein the discharge capacity of said cathode active material is 149 mAh g$^{-1}$ at 2 C rate.

6. The battery of claim 1, wherein the discharge capacity of said cathode active material is 113 mAh g$^{-1}$ at 20 C rate.

7. The battery of claim 1, wherein the discharge capacity of said cathode active material is 93 mAh g$^{-1}$ at 30 C rate.

8. A cathode active material for a lithium-ion battery, comprising:
    a lithium iron phosphate/sulfonated graphene oxide (LFP/SG) nanocomposite material.

9. The cathode active material of claim 8, wherein the molar ratio of sulfonated graphene oxide (SG) to lithium iron phosphate (LFP) in said cathode active material is 0.1:1.

10. The cathode active material of claim 8, is synthesized by microwave-assisted hydrothermal method.

11. The cathode active material of claim 8, wherein the discharge capacity of said cathode active material is 168 mAh g$^{-1}$ at 0.2 C rate.

12. The cathode active material of claim 8, wherein the discharge capacity of said cathode active material is 149 mAh g$^{-1}$ at 2 C rate.

13. The cathode active material of claim 8, wherein the discharge capacity of said cathode active material is 113 mAh g$^{-1}$ at 20 C rate.

14. The cathode active material of claim 8, wherein the discharge capacity of said cathode active material is 93 mAh g$^{-1}$ at 30 C rate.

* * * * *